United States Patent
Jung et al.

(10) Patent No.: US 12,195,016 B2
(45) Date of Patent: Jan. 14, 2025

(54) APPARATUS FOR EXTRACTING DRIVING DATA OF AUTONOMOUS DRIVING VEHICLE, AND SYSTEM AND METHOD FOR THE SAME

(71) Applicants: Hyundai Motor Company, Seoul (KR); Kia Corporation, Seoul (KR); Hyundai Autoever Corp., Seoul (KR)

(72) Inventors: Ho Choul Jung, Gyeonggi-do (KR); Kyu Baek Jung, Gyeonggi-do (KR); Sung Mo Dong, Seoul (KR); Ji Yong Lee, Seoul (KR)

(73) Assignees: Hyundai Motor Company, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 606 days.

(21) Appl. No.: 17/476,168

(22) Filed: Sep. 15, 2021

(65) Prior Publication Data
US 2022/0402510 A1 Dec. 22, 2022

(30) Foreign Application Priority Data
Jun. 22, 2021 (KR) .................. 10-2021-0081148

(51) Int. Cl.
*B60W 50/00* (2006.01)
*B60W 50/02* (2012.01)
(Continued)

(52) U.S. Cl.
CPC ...... *B60W 50/0205* (2013.01); *B60W 60/001* (2020.02); *G07C 5/008* (2013.01); *B60W 2556/45* (2020.02)

(58) Field of Classification Search
CPC ........ B60W 50/0205; B60W 2556/45; B60W 50/00; B60W 20/00; B60W 2556/65;
(Continued)

(56) References Cited

U.S. PATENT DOCUMENTS 7,447,576 B2 * 11/2008 Ban .................. H04L 67/125
701/32.7
7,584,029 B2 * 9/2009 Legate .................. G07C 5/008
703/22
(Continued)

FOREIGN PATENT DOCUMENTS

WO WO-2021197864 A1 * 10/2021 ............ B60W 50/02

*Primary Examiner* — Steven B Theriault
(74) *Attorney, Agent, or Firm* — Fox Rothschild LLP (57) ABSTRACT

A driving data extracting apparatus for an autonomous driving vehicle includes: a storage module for storing driving data of the autonomous driving vehicle; a driving record module configured to manage recording of the driving data, to divide the driving data into a plurality of pieces depending on a frame size based on a diagnostic protocol of unified diagnostic services (UDS), and to output the divided driving data by using a routine control (RID) service; a diagnostic module configured to receive a request for extraction of the driving data from an external data extracting equipment, to sequentially receive the divided driving data from the driving record module, and to sequentially transmit the driving data to the data extracting equipment; and a diagnostic communication module configured to perform diagnostic communication based on the diagnostic protocol of the USD between the data extracting equipment and the diagnostic module.

19 Claims, 9 Drawing Sheets

(51) Int. Cl.
    *B60W 60/00*     (2020.01)
    *G07C 5/00*     (2006.01)

(58) Field of Classification Search
    CPC ............ H04L 2209/84; G05B 23/0213; G05B 2219/24065; G05B 23/0262; G05B 2219/2637; G05B 23/0275; G05B 2219/25032; G05B 23/0264; B60R 16/0231; B60R 16/023
    See application file for complete search history.

(56) References Cited

U.S. PATENT DOCUMENTS

| | | | | |
|---|---|---|---|---|
| 7,852,860 | B2* | 12/2010 | Aizu | H04L 41/0226 370/395.5 |
| 8,554,896 | B2* | 10/2013 | Sodergren | G05B 19/0423 709/208 |
| 8,813,061 | B2* | 8/2014 | Hoffman | G06F 8/65 717/172 |
| 10,067,502 | B1* | 9/2018 | Delp | G06Q 50/40 |
| 11,360,762 | B2* | 6/2022 | Teraoka | G06F 8/658 |
| 2005/0154500 | A1* | 7/2005 | Sonnenrein | H04L 67/025 701/1 |
| 2005/0267655 | A1* | 12/2005 | Gessner | B60R 16/0231 701/29.1 |
| 2006/0095174 | A1* | 5/2006 | Sonnenrein | G07C 5/008 701/31.5 |
| 2009/0307400 | A1* | 12/2009 | Machauer | H04L 69/32 710/110 |
| 2010/0106324 | A1* | 4/2010 | Grohman | H04L 12/407 709/221 |
| 2010/0150176 | A1* | 6/2010 | Yakashiro | H04L 12/40163 370/475 |
| 2010/0199080 | A1* | 8/2010 | Kolb | G07C 5/0808 713/150 |
| 2014/0067195 | A1* | 3/2014 | James | G06Q 10/06 701/32.4 |
| 2014/0258581 | A1* | 9/2014 | Hartwich | H04L 1/0083 710/307 |
| 2014/0277922 | A1* | 9/2014 | Chinnadurai | G07C 5/0808 701/33.2 |
| 2014/0282470 | A1* | 9/2014 | Buga | G06F 8/65 717/170 |
| 2014/0337680 | A1* | 11/2014 | Hwang | H04L 1/1809 714/748 |
| 2015/0029987 | A1* | 1/2015 | Addepalli | B60W 50/10 370/329 |
| 2015/0071115 | A1* | 3/2015 | Neff | H04L 43/12 370/254 |
| 2016/0197932 | A1* | 7/2016 | Hoffman | H04L 63/1441 726/4 |
| 2017/0103587 | A1* | 4/2017 | Oberschachtsiek | G07C 5/008 |
| 2017/0171051 | A1* | 6/2017 | Joo | H04L 47/24 |
| 2017/0214760 | A1* | 7/2017 | Lee | H04L 67/563 |
| 2018/0113702 | A1* | 4/2018 | Elizalde | G06F 8/65 |
| 2019/0114345 | A1* | 4/2019 | Misawa | H03M 7/3079 |
| 2019/0235855 | A1* | 8/2019 | Nakano | B60R 16/023 |
| 2020/0326723 | A1* | 10/2020 | Ayers | H04L 67/12 |
| 2020/0382597 | A1* | 12/2020 | Jung | H04L 12/4135 |
| 2021/0012587 | A1* | 1/2021 | Qu | G07C 5/0808 |
| 2021/0065474 | A1* | 3/2021 | Liu | G07C 5/0808 |
| 2021/0092019 | A1* | 3/2021 | Fang | H04L 41/0894 |
| 2021/0136182 | A1* | 5/2021 | Jung | H04L 69/18 |
| 2021/0141634 | A1* | 5/2021 | Jeong | G06F 8/658 |
| 2021/0226818 | A1* | 7/2021 | Quinton | G06F 13/4295 |
| 2021/0229699 | A1* | 7/2021 | Chen | G07C 5/0841 |
| 2021/0367930 | A1* | 11/2021 | Wang | H04L 9/3271 |
| 2022/0036319 | A1* | 2/2022 | Bittar | G06Q 10/20 |
| 2022/0046114 | A1* | 2/2022 | Entelis | H04L 12/40 |
| 2022/0158843 | A1* | 5/2022 | Franyie Quintana | H04L 9/0643 |
| 2022/0237958 | A1* | 7/2022 | Tzamaloukas | H04L 12/40 |
| 2022/0245085 | A1* | 8/2022 | Abadie | G06F 13/4068 |
| 2023/0153097 | A1* | 5/2023 | Afantenos | B60W 50/02 717/168 |
| 2023/0406330 | A1* | 12/2023 | Woodbury | B60W 50/14 |

* cited by examiner

| Classification | Summary |
|---|---|
| Version of driving record module | For version information of tester and driving record module |
| Status | Previous chunk status: Checking of transmission state of previous chunk in continous chunk transmission |
| ChunkCounter | Previous transfer chunk counter: counter of previous transmitted chunk in continous chunk transmission |

Fig.6A

| Classification | Summary |
| --- | --- |
| Version of driving record module | For version information of tester and driving record module |
| TotalChunkNumber | Total number of chunks to be transmitted |
| ChunkCounter | Current transfer chunk counter: currently transmitted chunk counter |
| ChunkPayload | Current transfer chunk payload: capacity of currently transmitted chunk |

APPARATUS FOR EXTRACTING DRIVING DATA OF AUTONOMOUS DRIVING VEHICLE, AND SYSTEM AND METHOD FOR THE SAME

CROSS-REFERENCE TO RELATED APPLICATION

This application claims under 35 U.S.C. § 119(a) the benefit of Korean Patent Application No. 10-2021-0081148, filed in the Korean Intellectual Property Office on Jun. 22, 2021, the entire contents of which are incorporated herein by reference.

BACKGROUND

(a) Technical Field

The present disclosure relates to a driving data extracting apparatus for an autonomous driving vehicle, and a system and method for extracting driving data, more particularly, to the apparatus, system and method for extracting driving record data of the autonomous driving vehicle.

(b) Description of the Related Art

A device that records and stores data while a vehicle equipped with an autonomous driving system is driving in an autonomous driving mode is referred to as a data logger. Diagnostic communication is used to extract data stored in a data logger, and a diagnostic message is constructed based on a unified diagnostic services (UDS) protocol.

A UDS is used to extract autonomous driving data stored in the data logger, and stored data extraction is performed between a diagnosis device (tester) and the data logger based on the UDS. The UDS protocol and data logger are based on a software platform, and a UDS frame size is limited to 1.5 KB in maximum capacity.

Accordingly, a method for extracting a large amount of autonomous driving data that is expected to be hundreds of KB would be desirable.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure provides a driving data extracting apparatus for an autonomous driving vehicle, and a system and method for extracting driving data, where the apparatus, system and method are capable of extracting a large amount of driving record data of the autonomous driving vehicle and extracting driving record data from vehicle on board diagnostics (OBD) and a controller unit while overcoming transmission limitations of a unified diagnostic services (UDS) diagnostic protocol by extracting the driving record data by using routine control (RID) and diagnostic identifier (DID) based on the UDS diagnostic protocol together.

The technical objects of the present disclosure are not limited to the objects mentioned above, and other technical objects not mentioned can be clearly understood by those skilled in the art from the description of the claims.

An exemplary embodiment of the present disclosure provides a driving data extracting apparatus for an autonomous driving vehicle, including: a storage module configured to store driving data of the autonomous driving vehicle; a driving record module configured to manage recording of the driving data, to divide the driving data into a plurality of pieces depending on a frame size based on a diagnostic protocol of unified diagnostic services (UDS), and to output the divided driving data by using a routine control (RID) service and a read data by an identifier (DID) service based on the diagnostic protocol of the UDS; a diagnostic module configured to receive a request for extraction of the divided driving data from an external data extracting equipment, to sequentially receive the divided driving data from the driving record module, and to sequentially transmit the driving data to the data extracting equipment; and a diagnostic communication module configured to perform diagnostic communication based on the diagnostic protocol of the USD between the data extracting equipment and the diagnostic module.

In an exemplary embodiment, the driving recording module may define a single DID and a single RID, and may sequentially transmit the divided driving data through the single DID and the single RID.

In an exemplary embodiment, the diagnostic communication module, when receiving a routine control request (RID) for extraction of first driving data among the divided driving data from the data extracting equipment, may transmit a routine service call-out to the diagnostic module.

In an exemplary embodiment, the diagnostic communication module, when receiving the routine control request from the data extracting equipment, may receive version information of the data extracting equipment, extraction state information of previously received driving data, and number information of extracted previous driving data together.

In an exemplary embodiment, the diagnostic module, when receiving the routine service call-out, may request reading data to the driving record module.

In an exemplary embodiment, the driving recording module may transmit the first driving data to the diagnostic module.

In an exemplary embodiment, the driving recording module, when transmitting the first driving data, may transmit transmission state information thereof indicating whether data transmission is possible together.

In an exemplary embodiment, the driving recording module may transmit version information of the driving record module, a total number of the divided driving data, a number (counter) of currently transmitted driving data, and a capacity of the currently transmitted driving data together.

In an exemplary embodiment, the diagnostic module may transmit the transmission state information of the driving record module and the transmission state information of the diagnostic module together to the data extracting equipment.

In an exemplary embodiment, the diagnostic communication module, when receiving a read control request (DID) for extraction of first driving data among the divided driving data from the data extracting equipment, may transmit a read service call-out to the diagnostic module.

In an exemplary embodiment, the diagnostic module, when performing the routine control, may transmit the first driving data received from the driving record module to the data extracting equipment through the diagnostic communication module.

In an exemplary embodiment, the diagnostic communication module, when receiving a routine control request (RID) for extraction of second driving data among the divided driving data from the data extracting equipment, may transmit a routine service call-out to the diagnostic module.

In an exemplary embodiment, the diagnostic module, when receiving a request for routine control for extracting first driving data among the divided driving data from the data extracting equipment, may receive the first driving data by requesting transmission of the first driving data to the driving recording module, and may inform that the transmission of the first driving data to the data extracting equipment is possible.

In an exemplary embodiment, the diagnostic module, when receiving a read control request for extraction of the first driving data from the data extracting equipment, may transmit the first driving data to the data extracting equipment.

In an exemplary embodiment, the diagnostic module, after the extraction of the first driving data is completed, when receiving a request for routine control for extracting second driving data among the divided driving data from the data extracting equipment, may receive the second driving data by requesting transmission of the second driving data to the driving recording module, and then informs that the transmission of the second driving data to the data extracting equipment is possible.

In an exemplary embodiment, the diagnostic module, when receiving a read control request for extraction of the second driving data from the data extracting equipment, may transmit the second driving data to the data extracting equipment. An exemplary embodiment of the present disclosure provides a driving data extracting system for an autonomous driving vehicle, including: a data extracting equipment configured to extract driving data of an autonomous driving vehicle; and a driving data extracting apparatus configured to manage recording of the driving data, to divide the driving data into a plurality of pieces depending on a frame size based on a diagnostic protocol of unified diagnostic services (UDS), and to transmit the divided driving data to the data extracting equipment by using a routine control (RID) service and a read data by an identifier (DID) service based on the diagnostic protocol of the UDS.

An exemplary embodiment of the present disclosure provides a driving data extracting method for an autonomous driving vehicle, including: recording driving data of the autonomous driving vehicle; when requested to extract driving data from an external data extracting equipment, dividing the driving data into a plurality of pieces depending on a frame size based on a diagnostic protocol of unified diagnostic services (UDS), and transmitting the divided driving data to the data extracting equipment by using a routine control (RID) service and a read data by an identifier (DID) service based on the diagnostic protocol of the UDS.

An exemplary embodiment of the present disclosure provides a driving data extracting method for an autonomous driving vehicle, including: recording driving data of the autonomous driving vehicle; when requested to extract driving data from an external data extracting equipment, dividing the driving data into a plurality of pieces depending on a frame size based on a diagnostic protocol of unified diagnostic services (USD), and transmitting the divided driving data to the data extracting equipment by using a routine control (RID) service and a read data by an identifier (DID) service based on the diagnostic protocol of the USD.

In an exemplary embodiment, the transmitting may include: receiving a routine control request for extraction of first driving data among the divided driving data from the data extracting equipment; extracting the first driving data and notifying that transmission of the first driving data to the data extracting equipment is possible; receiving a read control request for extraction of the first driving data from the data extracting equipment; and transmitting the first driving data to the data extracting equipment.

In an exemplary embodiment, the transmitting may include: after the extraction of the first driving data is completed, receiving a routine control request for extraction of second driving data among the divided driving data from the data extracting equipment; extracting the second driving data and notifying that transmission of the second driving data to the data extracting equipment is possible; receiving a read control request for extraction of the second driving data from the data extracting equipment; and transmitting the second driving data to the data extracting equipment.

According to the present technique, it is possible to extract a large amount of driving record data of the autonomous driving vehicle and to extract driving record data of the autonomous driving vehicle from vehicle on board diagnostics (OBD) and a controller unit while overcoming transmission limitations of a unified diagnostic services (UDS) diagnostic protocol by extracting the driving record data of the autonomous driving vehicle by using routine control (RID) and diagnostic identifier (DID) based on the UDS diagnostic protocol together.

In addition, various effects that can be directly or indirectly identified through this document may be provided.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIGS. 1-8.

Figure 1:
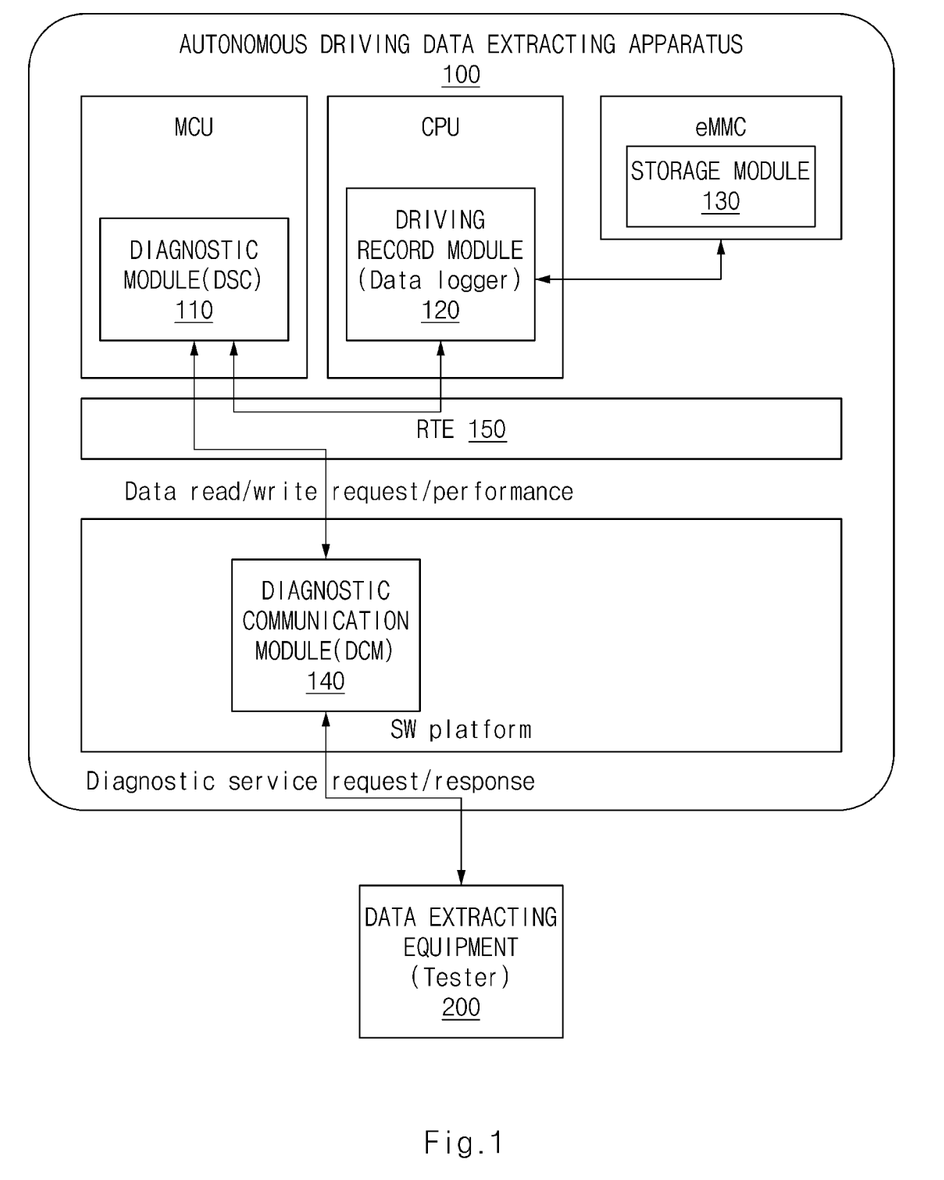
FIG. 1 illustrates a block diagram showing a configuration of a driving data extracting system for an autonomous driving apparatus according to an exemplary embodiment of the present disclosure.

FIG. 1 illustrates a block diagram showing a configuration of a driving data extracting system for an autonomous driving apparatus according to an exemplary embodiment of the present disclosure.

Referring to FIG. 1, a driving data extracting system for an autonomous driving vehicle according to an embodiment of the present disclosure may include an autonomous driving data extracting apparatus 100 and a data extracting equipment 200.

The autonomous driving data extracting apparatus 100 according to the exemplary embodiment of the present disclosure may be implemented inside a vehicle. In this case, the autonomous driving data extracting apparatus 100 may be integrally formed with internal control units of the vehicle, or may be implemented as a separate device to be connected to control units of the vehicle by a separate connection arrangement.

The autonomous driving data extraction apparatus 100 may store driving-related data during autonomous driving, and may transmit driving-related data stored based on a RID and a DID to the external data extracting equipment 200 at a request of the external data extracting equipment 200.

As shown in Table 1, the autonomous driving data extracting apparatus 100 may extract data of the autonomous driving vehicle by using a ReadDataByIdentifier (DID) service and a RoutineControl (RID) service together.

TABLE 1

| Service | Identifier | Description |
| --- | --- | --- |
| ReadDataByIdentifier | SID 22 | Reading data based on DID |
| RoutineControl | SID 31 | Executing a predefined routine (logic) and obtaining the result |

As shown in Table 1, the ReadDataByIdentifier (DID) service reads data based on the DID, and the RoutineControl (RID) service executes a predefined routine (logic) and obtains the result.

Referring to FIG. 1, the autonomous driving data extracting apparatus 100 may include a diagnostic module 110, a driving record module 120, a storage module 130, a diagnostic communication module 140, and a runtime environment (RTE) 150. Each component of the autonomous driving data extracting apparatus 100 may be an electric circuit that executes a command of software, thereby performing various data processing and calculations described later.

The diagnostic module 110, which is a diagnostic software component (DSC), may perform a diagnosis-related operation of the autonomous driving vehicle, and may perform communication between the diagnostic communication module 140 and the driving record module 120. For example, the diagnostic module 110 may be an electronic control unit (ECU), a micro controller unit (MCU), or other subcontrollers mounted in the vehicle.

When receiving a request for extracting driving data from the data extracting equipment 200, the diagnostic module 110 may sequentially receive the driving data divided into a plurality of pieces from the driving record module 120, and may sequentially transfer the driving data to the data extracting equipment 200.

The driving record module 120 may divide the driving data of the autonomous driving vehicle into a plurality of pieces depending on a frame size based on a diagnostic protocol of unified diagnostic services (UDS), and may transmit the divided driving data to the data extracting equipment 200 outside the vehicle by using a routine control (RID) service and a read data by an identifier (DID) service based on the diagnostic protocol of the UDS.

The driving record module 120 may divide the driving data of the autonomous driving vehicle into a plurality of pieces depending on a frame size based on a diagnostic protocol of unified diagnostic services (USD), and may transmit the divided driving data to the data extracting equipment 200 outside the vehicle by using a routine control (RID) service and a read data by an identifier (DID) service based on the diagnostic protocol of the USD.

The storage module 130 may store driving information extracted by the driving record module 120, and data and/or algorithms required for the driving record module 120 and the diagnostic module 110 to operate.

As an example, the storage module 130 may store driving data such as a sensing result of a sensor during autonomous driving, a current vehicle speed, obstacle information, map information, a driving state of the vehicle, and vehicle data. The driving-related data stored in the storage module 130 may include large-capacity data of about 200 KB or more.

The storage module 130 may include an embedded multimedia card (eMMC), a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The diagnostic communication module 140, which is a diagnostic communication manager (DCM), may be implemented based on a software platform, and may perform a diagnostic function based on AUTOSAR.

The RTE 150 may perform communication between the software platform of the diagnostic communication module 140 and the diagnostic module 110, and communication between the diagnostic module 110 and the driving record module 120.

The data extracting equipment 200 requests extraction of autonomous driving data to the autonomous driving data extracting apparatus 100 through an external module diagnostic message that can perform interfacing through a predefined diagnostic protocol, and may receive stored data in response to the request from the driving record module 120 which is a data logger.

The diagnostic module 110, the driving record module 120, and the diagnostic communication module 140 may be implemented in the form of hardware, software, or a combination of hardware and software, or may be, e.g., an electronic control unit (ECU), a micro controller unit (MCU), or other subcontrollers mounted in the vehicle.

As such, according to the present disclosure, driving data divided into a plurality of pieces may be sequentially transmitted through a single DID and a single RID by defining the single DID and the single RID.

Figure 2:
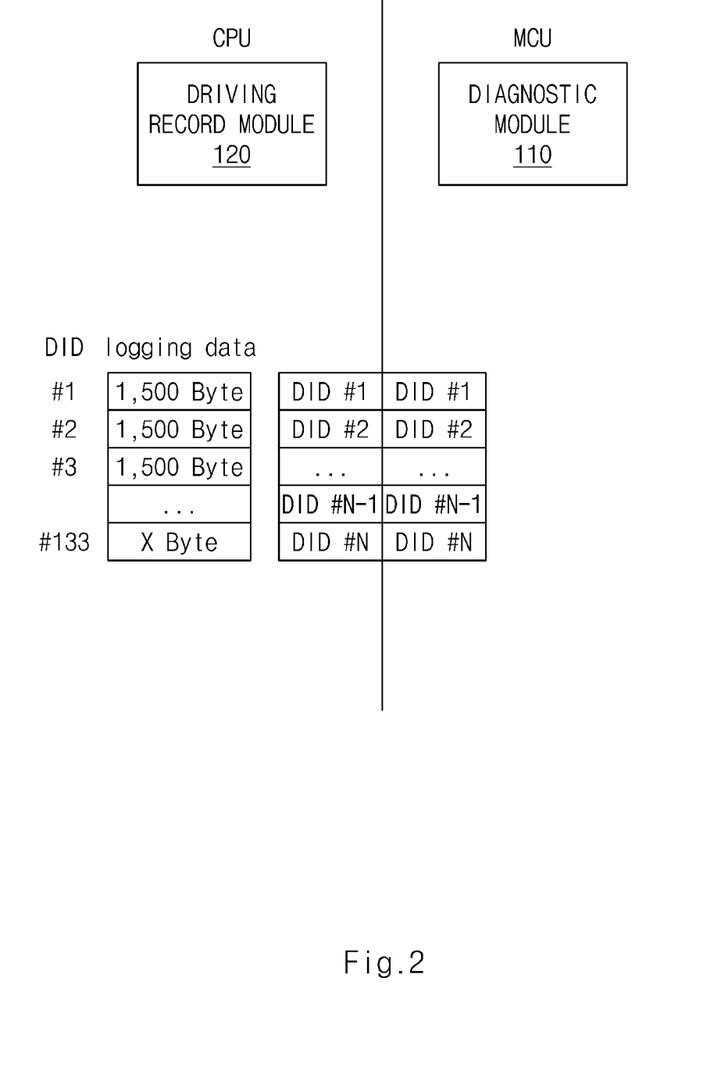
FIG. 2 illustrates a view for describing a driving data extracting method for an autonomous driving apparatus according to an exemplary embodiment of the present disclosure.
Figure 3:
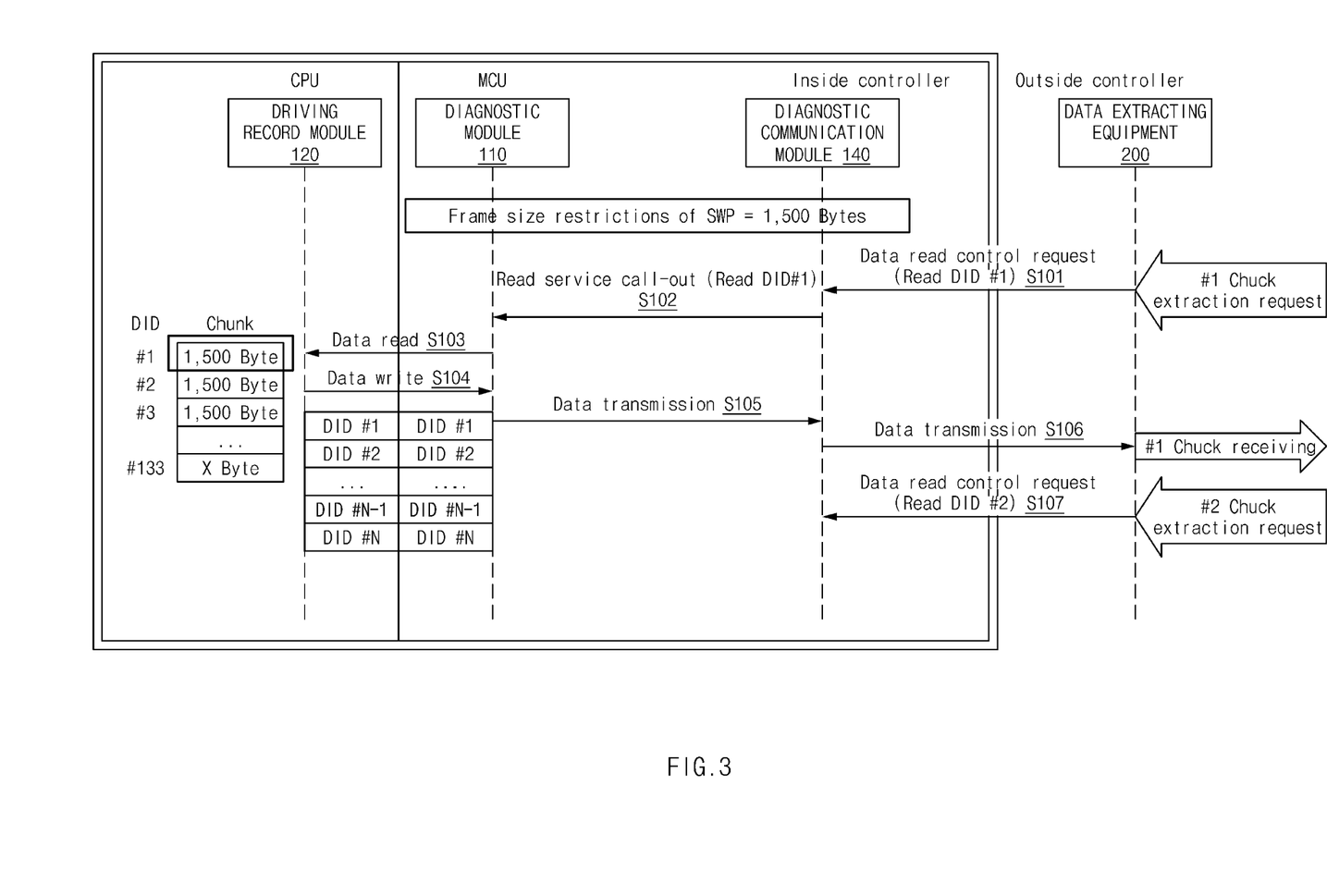
FIG. 3 illustrates a flowchart showing a driving data extracting operation for an autonomous driving apparatus according to an exemplary embodiment of the present disclosure.

FIG. 2 illustrates a view for describing a driving data extracting method for an autonomous driving apparatus according to an exemplary embodiment of the present disclosure, and FIG. 3 illustrates a flowchart showing a driving data extracting operation for an autonomous driving apparatus according to an exemplary embodiment of the present disclosure.

A method of extracting driving data of a vehicle using a DID-based ReadDataByIdentifier service will be described in FIG. 2 and FIG. 3.

Referring to FIG. 2, when extracting driving data of a vehicle based on a DID as in an embodiment of the present disclosure, memory allocation for individual DIDs is required in order to extract logging data. In this case, since memory allocation is required for each of a CPU of the driving recording module 120 and a MCU of the diagnostic module 110, a capacity twice as large as a total number of each memory (memory #N) is required. This may result in insufficient system memory.

The logging data is transmitted by being divided into a frame size that can be transmitted once, and for example, it can be transmitted after being divided by 1500 bytes as the frame size that can be transmitted once. Accordingly, a DID definition is required for each chunk that is individual divided data, and for example, the DID definition is required for each individual divided data of 1500 bytes.

For example, when total size of driving data is 200 Kbytes, dividing 200 Kbytes by 1500 bytes gives 133, so a total of 133 DID definitions are needed, and thus for every 133 chunks, an identification number such as DID#1, DID#2, . . . , and DID#133 may be assigned.

An individual DID may be formed to include an array of up to 1,500 bytes, 1,500 bytes×N memory allocation is required in order to secure N DIDs, and memories must be allocated to both CPU and MCU, it becomes difficult to secure the memories.

Referring to FIG. 3, when the data extracting equipment 200 requests data read control to the diagnostic communication module 140 of the autonomous driving data extracting apparatus 100 in a vehicle of a first chunk (#1 chunk) to extract driving data of the autonomous driving vehicle (S101), the diagnostic communication module 140 requests read service call-out to the diagnostic module 110 (S102). In this case, the call-out refers to an operation in which a terminal device connected to a communication network calls a counterpart device that communicates as a call.

Accordingly, the diagnostic module 110 called out by the diagnostic communication module 140 requests reading vehicle driving-related data to the driving record module 120 (S103), and the driving record module 120 reads data of a first chunk (#1 Chunk) from the storage module 130 and writes the data of the first chunk (#1 Chunk) to the diagnostic module 110 (S104). Then, the diagnostic module 110 may transmit the data of the first chunk (#1 Chunk) received from the driving recording module 120 to the diagnostic communication module 140 (S105), and the diagnostic communication module 140 may transmit the received data of the first chunk (Chunk #1) to the external data extracting equipment 200 of the autonomous driving data extracting apparatus 100 (S106).

Then, the data extracting equipment 200 performs a data read control request to the diagnostic communication module 140 to extract data of a second chunk (Chunk #2) (S107). A subsequent process is the same as S102 to S106, which are the data extraction process of the first chunk described above, and the above-described process may be repeated for a third chunk, a fourth chunk, . . . , and a $n^{th}$ chunk.

As such, in the case of the ReadDataByIndentifier (0x22) service, when desired data (result value) is fetched from the controller through a diagnostic identifier (DID) and there is a lot of divided data, the DID of the memory area must be newly defined for each divided data.

Figure 4:
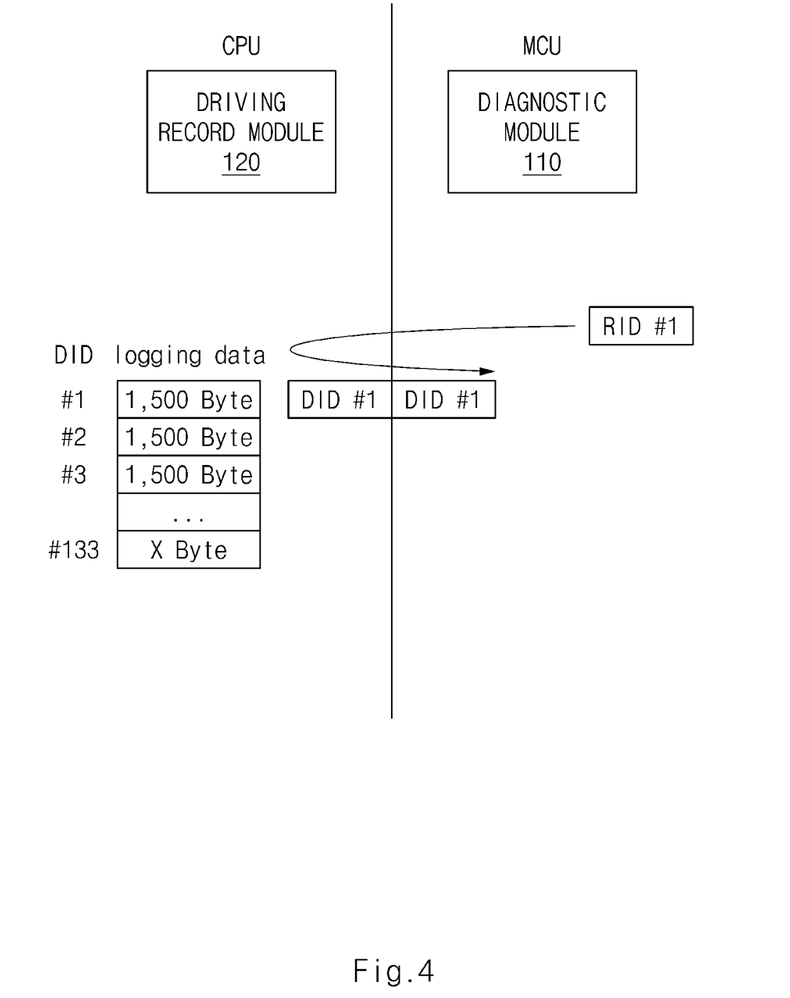
FIG. 4 illustrates a view for describing a driving data extracting method for an autonomous driving apparatus according to another exemplary embodiment of the present disclosure.
Figure 5:
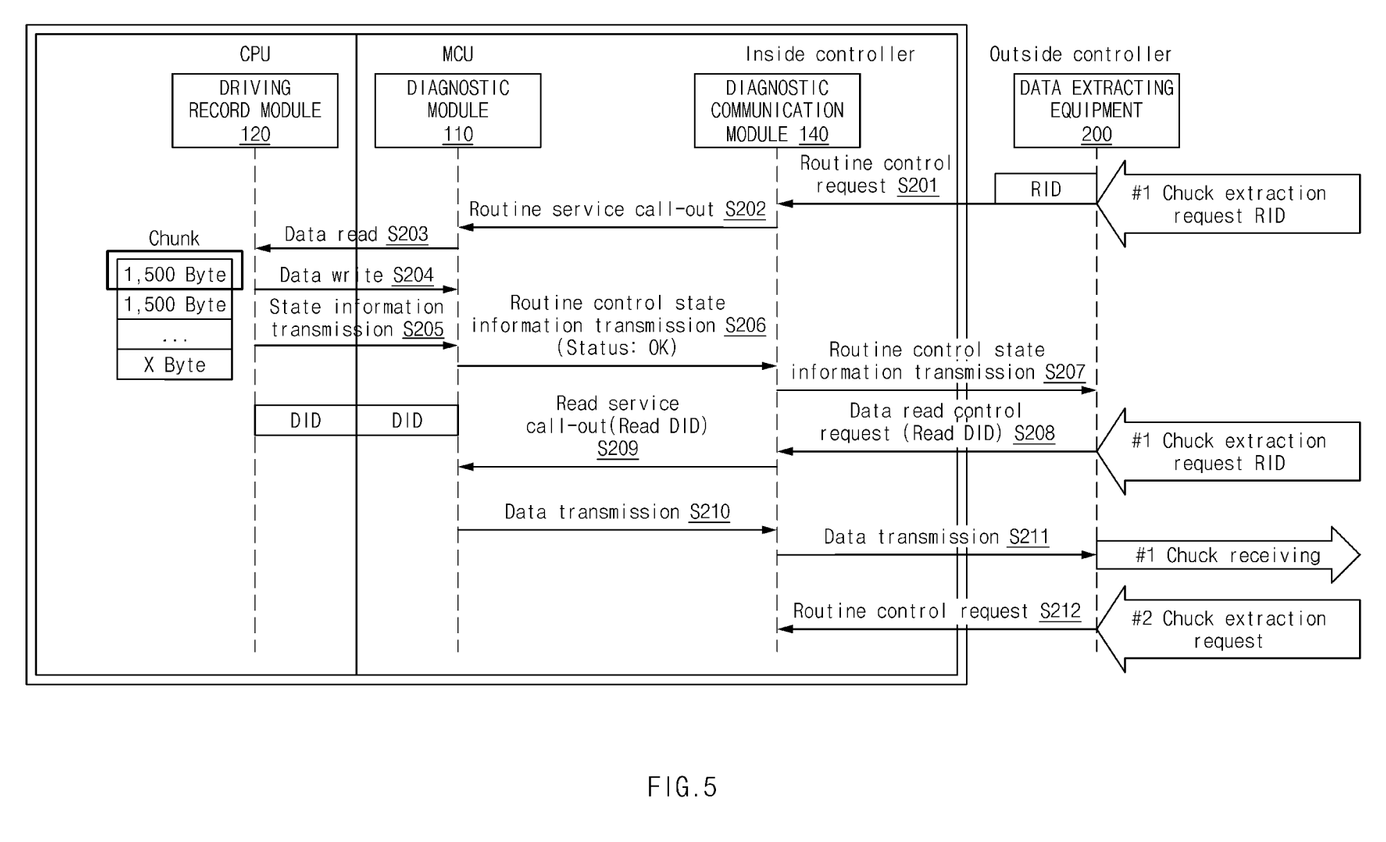
FIG. 5 illustrates a flowchart showing a driving data extracting operation for an autonomous driving apparatus according to another exemplary embodiment of the present disclosure.

FIG. 4 illustrates a view for describing a driving data extracting method for an autonomous driving apparatus according to another exemplary embodiment of the present disclosure, and FIG. 5 illustrates a flowchart showing a driving data extracting operation for an autonomous driving apparatus according to another exemplary embodiment of the present disclosure. A method of extracting driving data of a vehicle using a combination of a DID-based ReadDataByIdentifier service and a RID-based ReadDataByIdentifier service will be described in FIG. 4 and FIG. 5.

Referring to FIG. 4, when driving data is extracted by combining a RID and a DID, the driving data may be extracted by defining the RID and the DID one by one, so that it is not necessary to allocate a memory corresponding to a total data size. That is, a CPU and a MCU each allocate one memory area for 1500 bytes, and through one allocated memory area (DID #1), 330 divided logging data of 1500 bytes can be transferred one by one, so 330 memory allocations will not be necessary. That is, there is one array required for new definition of DID, and by allocating one memory area for 1,500 bytes of logging data, it is possible to overcome the memory load and extract large amounts of data as a diagnostic service.

Figure 6A:
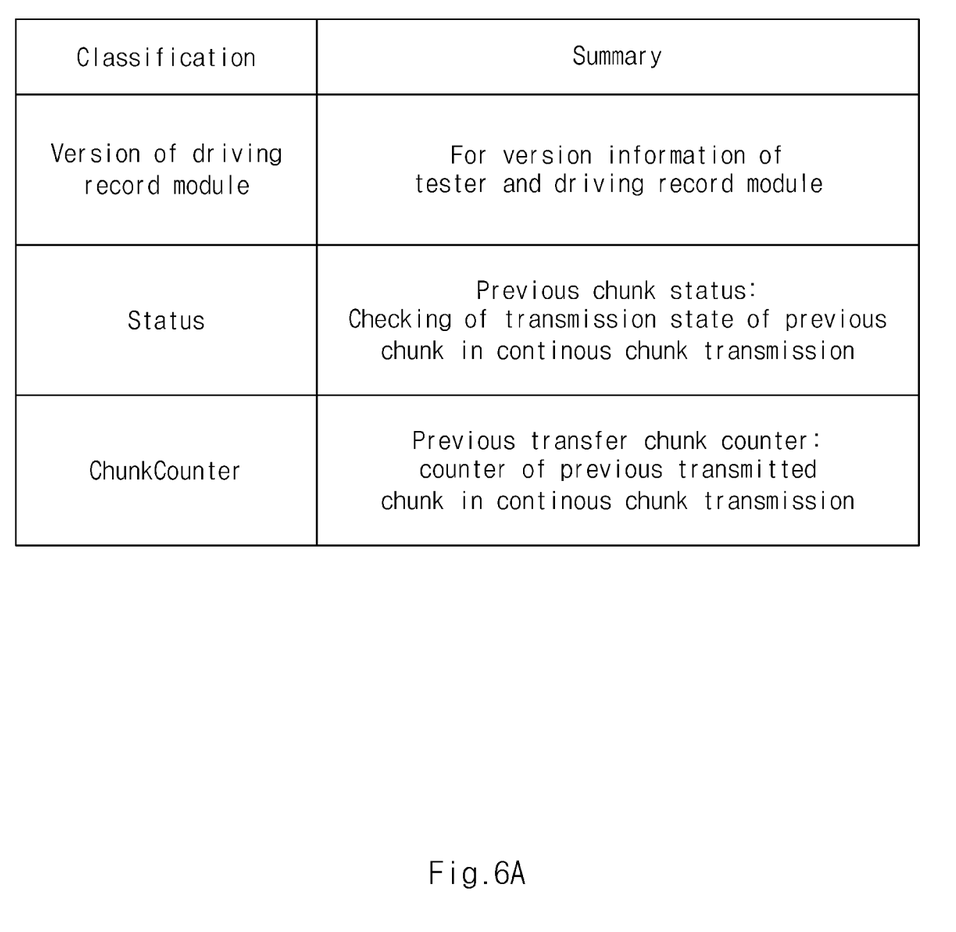
FIG. 6A illustrates a table including option information when a routine control for extracting driving data of an autonomous driving vehicle is requested according to another embodiment of the present disclosure.

Referring to FIG. 5, the data extracting equipment 200 requests routine control to the diagnostic communication module 140 for data extraction of the first chunk (Chunk #1) (S201). In this case, the data extracting equipment 200 may transmit option information to the diagnostic communication module 140 as illustrated in FIG. 6A. FIG. 6A illustrates a table including option information when a routine control for extracting driving data of an autonomous driving vehicle is requested according to another embodiment of the present disclosure. As illustrated in FIG. 6A, the option information may include version information of a driving record module, state information of a previous chunk, and counting information of a previously transmitted chunk. In this case, the diagnostic module 110 may check the version information of the driving record module and the version information of the data extracting equipment 200. In addition, the state information of the previous chunk may include information related to whether the chunk was normally received. The counting information of the previously transmitted chunk indicates the number of the previously transmitted chunk.

Then, the diagnostic communication module 140 performs a routine service call-out to the diagnostic module 110 (S202).

Accordingly, the diagnostic module 110 requests data reading to the driving record module 120 (S203), and the driving record module 120 obtains data from the storage module 130 and writes the data to the diagnostic module 110 (S204). In this case, data writing of the first chunk may be performed through one memory area allocated to the CPU and the MCU.

In addition, the driving record module 120 transmits routine control state information indicating that data transmission is possible to the diagnostic module 110 (S205). Accordingly, the diagnostic module 110 is pending until a data read control request (Read DID) is received from the diagnostic communication module 140.

Figure 6B:
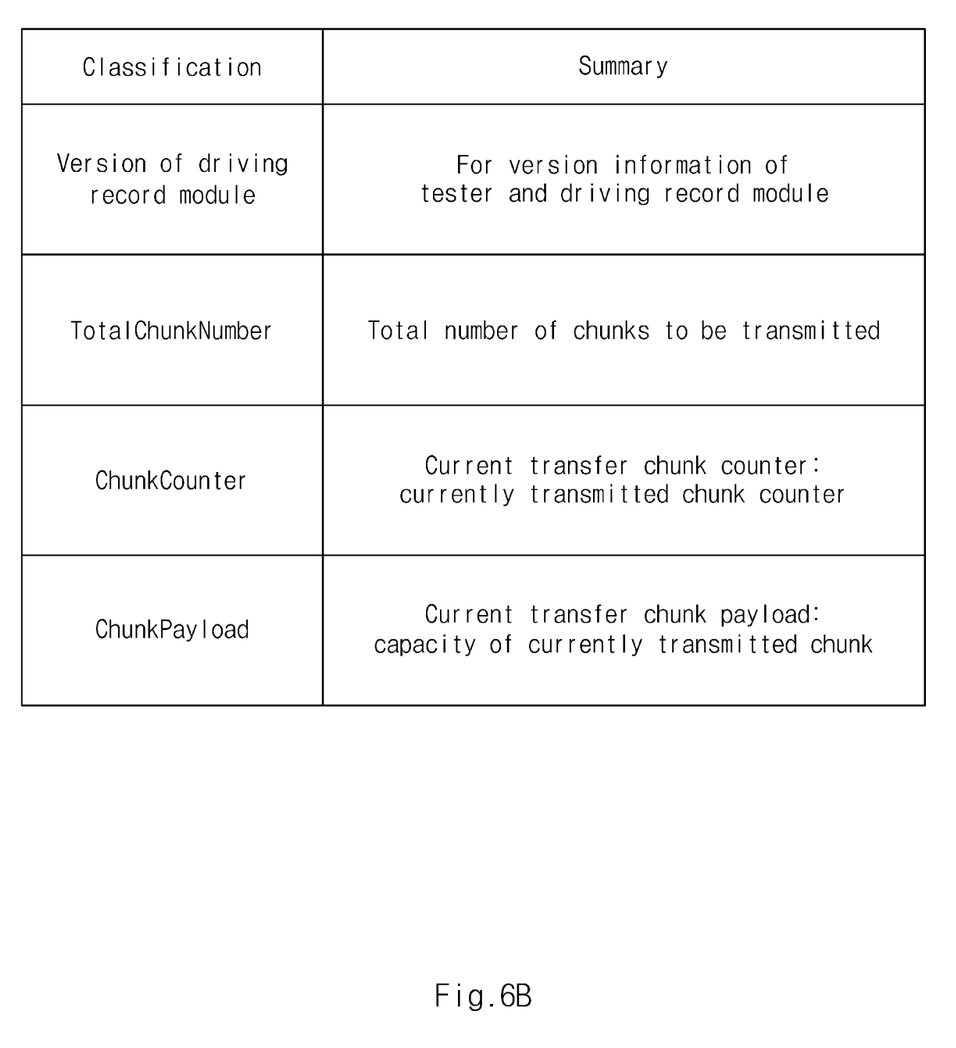
FIG. 6B illustrates a table including state information when a routine control for extracting driving data of an autonomous driving vehicle is requested according to another embodiment of the present disclosure.

In this case, the routine control state information may include version information of the driving record module, a total number of chunks to be transmitted (total number of divided data), counting information of a currently transmitted chunk (the number of the currently transmitted chunk), and a capacity of the current transmitted chunk, etc. as illustrated in FIG. 6B. FIG. 6B illustrates a table including state information when a routine control for extracting driving data of an autonomous driving vehicle is requested according to another embodiment of the present disclosure.

The diagnostic module 110 transmits routine control state information (e.g., Status: OK) indicating that data transmission is possible to the diagnostic communication module 140 (S206), and the diagnostic communication module 140 transmits the routine control status information to the data extracting equipment 200 (S207). Accordingly, the data extracting equipment 200 may check that data transmission preparation states of the diagnostic module 110 and the driving record module 120 are normal.

As such, when the data transmission preparation states of the diagnostic module 110 and the driving record module 120 are normal, the data extracting equipment 200 requests data read control for extracting data of the first chunk (Chunk #1) (Read DID) (S208).

The diagnostic communication module 140 requests a read service call-out to the diagnostic module 110 (S209).

Accordingly, the diagnostic module 110 called out by the diagnostic communication module 140 transmits the data of the first chunk (Chunk #1) received from the driving record module 120 in step S204 to the diagnostic communication module 140 (S210). The diagnostic communication module 140 may transmit the received data of the first chunk (Chunk #1) to the external data extracting equipment 200 of the autonomous driving data extracting apparatus 100 (S211).

Then, the data extracting equipment 200 performs a routine control request to the diagnostic communication module 140 to extract data of a second chunk (Chunk #2) (S212). A subsequent process is the same as S202 to S211, which are the data extraction process of the first chunk described above, and the above-described process may be repeated for a third chunk, a fourth chunk, . . . , and a $n^{th}$ chunk.

Figure 7:
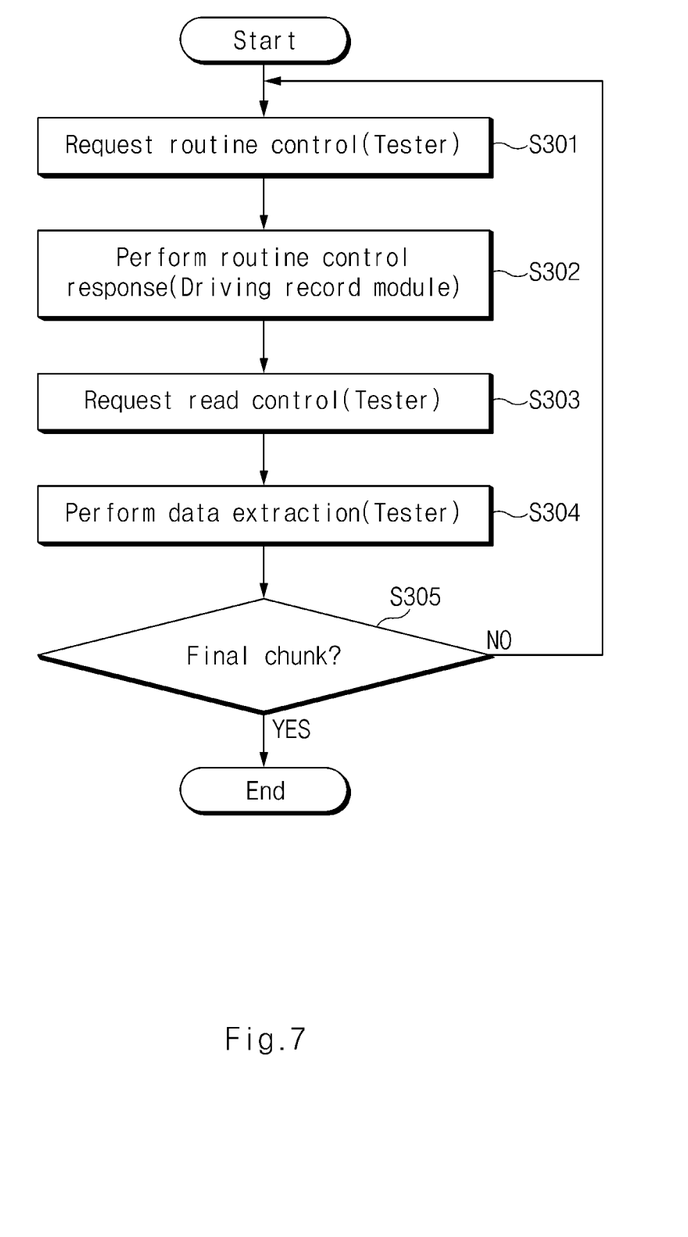
FIG. 7 illustrates a flowchart for describing a driving data extracting method for an autonomous driving apparatus according to another exemplary embodiment of the present disclosure.

Hereinafter, a driving data extracting method for an autonomous driving apparatus according to another exemplary embodiment of the present disclosure will be described with reference to FIG. 7. FIG. 7 illustrates a flowchart for describing a driving data extracting method for an autonomous driving apparatus according to another exemplary embodiment of the present disclosure.

Hereinafter, it is assumed that the data extract system for the autonomous driving vehicle of FIG. 1 performs processes of FIG. 7. In addition, in the description of FIG. 7, it may be understood that operations described as being performed by each module are controlled by a processor.

Referring to FIG. 7, when the external data extracting equipment 200 (Tester) requests routine control to the driving record module 120 of the autonomous driving data extracting apparatus 100 (S301), the driving record module 120 performs a routine control response to the data extracting equipment 200 (Tester) (S302). In this case, the routine control response is a response to whether routine control is possible, that is, whether data transmission is possible.

Referring to FIG. 7, when the routine control is possible, the data extracting equipment 200 (Tester) requests read control to the driving record module 120 of the autonomous driving data extracting equipment 100 (S303), and the driving record module 120 extracts the data of the first chunk and transmits it to the data extracting equipment 200 (Tester) (S304).

The data extracting equipment 200 (Tester) may determine whether the received chunk is a last chunk of the driving data to be extracted, and when it is not the last chunk, the steps S301 to S304 may be repeated.

As such, according to the present disclosure, when the driving data is extracted by using only the DID, it is possible to extract a large amount of autonomous driving data while solving the problem of memory allocation restrictions and it is possible to extract the driving data of the autonomous driving vehicle from the vehicle OBD and the controller unit.

Figure 8:
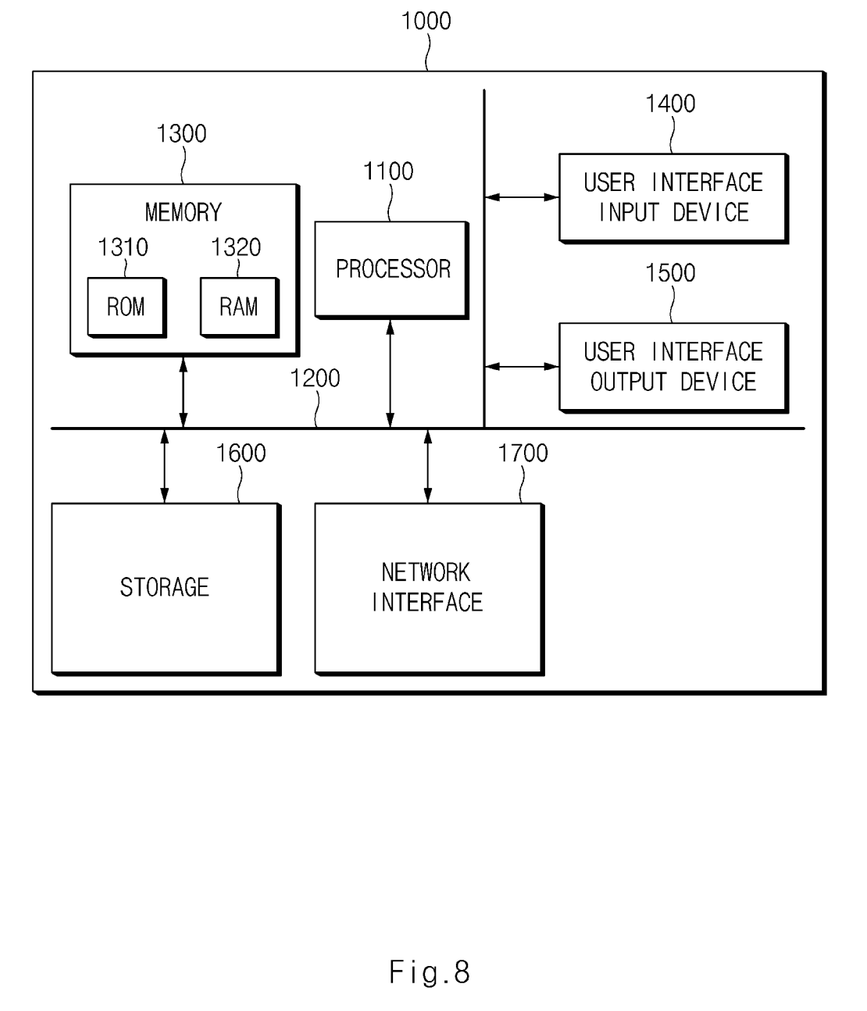
FIG. 8 illustrates a computing system according to an exemplary embodiment of the present disclosure.

FIG. 8 illustrates a computing system according to an exemplary embodiment of the present disclosure.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A driving data extracting apparatus for an autonomous driving vehicle, the driving data extracting apparatus comprising:
    a memory storing program instructions; and
    a processor configured to execute the program instructions;
    wherein, when executed, the instructions cause the processor to:
        store driving data of the autonomous driving vehicle;
        manage recording of the driving data;
        divide the driving data into a plurality of pieces depending on a frame size based on a diagnostic protocol of unified diagnostic services (UDS),
        output the divided driving data by using a routine control (RID) service and a read data by an identifier (DID) service based on the diagnostic protocol of the UDS;
        define a single DID and a single RID;
        receive a request for extraction of the divided driving data from an external data extracting equipment,
        sequentially receive the divided driving data from the driving record module,
        sequentially transmit the driving data to the data extracting equipment through one memory area allocated based on the single DID and the single RID; and
        perform diagnostic communication based on the diagnostic protocol of the UDS between the data extracting equipment and the diagnostic module.

2. The driving data extracting apparatus of claim 1, wherein the instructions, when executed, further cause the processor to, when receiving a routine control request (RID) for extraction of first driving data among the divided driving data from the data extracting equipment, transmit a routine service call-out to the diagnostic module.

3. The driving data extracting apparatus of claim 2, wherein the instructions, when executed, further cause the processor to, when receiving the routine control request from the data extracting equipment, receive version information of the data extracting equipment, extraction state information of previously received driving data, and number information of extracted previous driving data together.

4. The driving data extracting apparatus of claim 2, wherein the instructions, when executed further cause the processor to, when receiving the routine service call-out, request reading data to the driving record module.

5. The driving data extracting apparatus of claim 4, wherein the driving record module transmits the first driving data to the diagnostic module.

6. The driving data extracting apparatus of claim 5, wherein the instructions, when executed, further cause the processor to, when transmitting the first driving data, transmit transmission state information thereof indicating whether data transmission is possible together.

7. The driving data extracting apparatus of claim 6, wherein the instructions, when executed, further cause the processor to transmit version information of the driving record module, a total number of the divided driving data, a number of currently transmitted driving data, and a capacity of the currently transmitted driving data together.

8. The driving data extracting apparatus of claim 6, wherein the instructions, when executed, further cause the processor to transmit the transmission state information of the driving record module and the transmission state information of the diagnostic module together to the data extracting equipment.

9. The driving data extracting apparatus of claim 1, wherein the instructions, when executed, further cause the processor to, when receiving a read control request (DID) for extraction of first driving data among the divided driving data from the data extracting equipment, transmits a read service call-out to the diagnostic module.

10. The driving data extracting apparatus of claim 8, wherein the instructions, when executed, further cause the processor to, when performing routine control, transmit the first driving data received from the driving record module to the data extracting equipment through the diagnostic communication module.

11. The driving data extracting apparatus of claim 10, wherein the instruction, when executed, further cause the processor to, when receiving a routine control request (RID) for extraction of second driving data among the divided driving data from the data extracting equipment, transmit a routine service call-out to the diagnostic module.

12. The driving data extracting apparatus of claim 1, wherein the instructions, when executed, further cause the processor to, when receiving a request for routine control for extracting first driving data among the divided driving data from the data extracting equipment, receive the first driving data by requesting transmission of the first driving data to the driving recording module, and informs that the transmission of the first driving data to the data extracting equipment is possible.

13. The driving data extracting apparatus of claim 12, wherein the instructions, when executed, further cause the processor to, when receiving a read control request for extraction of the first driving data from the data extracting equipment, transmit the first driving data to the data extracting equipment.

14. The driving data extracting apparatus of claim 13, wherein the instructions, when executed, further cause the processor to, after the extraction of the first driving data is completed, when receiving a request for routine control for extracting second driving data among the divided driving data from the data extracting equipment, receive the second driving data by requesting transmission of the second driving data to the driving recording module, and then informs that the transmission of the second driving data to the data extracting equipment is possible.

15. The driving data extracting apparatus of claim 14, wherein the instructions, when executed, further cause the processor to, when receiving a read control request for extraction of the second driving data from the data extracting equipment, transmit the second driving data to the data extracting equipment.

16. A driving data extracting system for an autonomous driving vehicle, the system comprising:
a data extracting equipment configured to extract driving data of an autonomous driving vehicle; and
a driving data extracting apparatus configured to:
manage recording of the driving data,
divide the driving data into a plurality of pieces depending on a frame size based on a diagnostic protocol of unified diagnostic services (UDS);
define a single identifier (DID) and a single routine control (RID) using an RID service and a read data using a DID service based on the diagnostic protocol of the UDS;
sequentially transmit the divided driving data to the data extracting equipment through one memory area allocated based on the single DID and the single RID.

17. A driving data extracting method for an autonomous driving vehicle, the method comprising:
recording driving data of the autonomous driving vehicle;
when requested to extract driving data from an external data extracting equipment,
dividing the driving data into a plurality of pieces depending on a frame size based on a diagnostic protocol of unified diagnostic services (UDS),
defining a single identifier (DID) and a single routine control (RID) using an RID service and a read data using a DID service based on the diagnostic protocol of the UDS, and
sequentially transmitting the divided driving data to the data extracting equipment through one memory area allocated based on the single DID and the single RID.

18. The driving data extracting method of claim 17, wherein the transmitting includes:
receiving a routine control request for extraction of first driving data among the divided driving data from the data extracting equipment;
extracting the first driving data and notifying that transmission of the first driving data to the data extracting equipment is possible;
receiving a read control request for extraction of the first driving data from the data extracting equipment; and
transmitting the first driving data to the data extracting equipment.

19. The driving data extracting method of claim 18, wherein the transmitting includes:
after the extraction of the first driving data is completed,
receiving a routine control request for extraction of second driving data among the divided driving data from the data extracting equipment;
extracting the second driving data and notifying that transmission of the second driving data to the data extracting equipment is possible;
receiving a read control request for extraction of the second driving data from the data extracting equipment; and
transmitting the second driving data to the data extracting equipment.

* * * * *